United States Patent [19]

Yokoyama

[11] 3,710,142

[45] Jan. 9, 1973

[54] SIGNAL GATING CIRCUIT

[75] Inventor: Hideo Yokoyama, Tokyo, Japan

[73] Assignee: Sony Corporation, Tokyo, Japan

[22] Filed: July 2, 1971

[21] Appl. No.: 159,291

[30] Foreign Application Priority Data

July 4, 1970 Japan ................................45/66887

[52] U.S. Cl. ....................307/242, 307/256, 307/259

[51] Int. Cl. ..............................................H03k 17/00

[58] Field of Search......307/241, 242, 253, 259, 256; 328/96, 97, 99, 100

[56] References Cited

UNITED STATES PATENTS

| | | | |
|---|---|---|---|
| 3,069,552 | 12/1962 | Thomson | 307/253 |
| 3,488,520 | 1/1970 | Hunter | 307/241 |
| 3,031,588 | 4/1962 | Hilsenrath | 307/253 |
| 2,683,803 | 7/1954 | Keizer | 328/100 X |
| 2,781,445 | 2/1957 | Stocker | 328/128 |

*Primary Examiner*—Herman Karl Saalbach
*Assistant Examiner*—B. P. Davis
*Attorney*—Lewis H. Eslinger et al.

[57] ABSTRACT

A signal gating circuit of such a type that signal gating is performed by switching off and on a signal transmission circuit which has a pair of parallel signal transmission paths, each of which includes a diode for gating a signal in response to a gating signal and circuit means for combining gated signals from both of said diodes to avoid a gating signal component included in each of the gated signals. Both of the gated signals from the diodes have the same phase and include the gating signal components of opposite phases to each other.

12 Claims, 14 Drawing Figures

INVENTOR
HIDEO YOKOYAMA
BY Lewis H. Eslinger

INVENTOR.
HIDEO YOKOYAMA
BY
Lewis H. Eslinger

INVENTOR.
HIDEO YOKOYAMA
BY
Lewis H. Eslinger

SIGNAL GATING CIRCUIT

BACKGROUND OF THE INVENTION

1. Field of the Invention

This invention relates generally to a signal gating circuit, and more particularly is directed to improvements in a signal gating circuit which employs a semiconductor switching element operable by a gating signal supplied thereto for intermittently gating an input signal.

2. Detailed Description of the Prior Art

Hitherto, use has been made of a signal gating circuit intermittently gating a continuous input signal in response to a certain signal or gating signal for many purposes such as modulation, demodulation and so on. Usually, such a signal gating circuit is roughly classified into two types. In one type of gating circuit, a switching element is connected between ground and a signal transmission path of the input signal and is turned on and off by the gating signal. When the switching element is turned on, a shunt path is thereby formed to short-circuit the input signal to provide no signal at the output terminal. Only when the switching element is turned off is the input signal transmitted to the output terminal. In another type of the gating circuit, a switching element is provided in series with the signal transmission path, and the switching element is turned on and off by the gating signal to interrupt the signal transmission path, thereby gating the input signal. The signal gating circuit of this invention is of the latter type and employs semiconductor elements as the switching element.

In connection with the latter type of signal gating circuit there have heretofore been proposed various circuits such as, for example, those in which a diode is interposed between the input and output terminals of the signal transmission path, and the gating signal is directly or indirectly supplied to the anode or the cathode of the diode to turn it on and off. Another such circuit is one in which the input and the output terminals of the signal transmission path are connected to the input and output terminals of a transistor to make up a signal transmission path including the transistor, and the transistor is turned on and off by the gating signal. In the conventional gating circuits, however, a potential change based on the gating signal appears at the output terminal of the signal transmission path. In other words, the prior art gating circuits have drawbacks such as the inclusion of a gating signal component in the gated output signal, the necessity of two positive and negative voltage power sources for operating the switching element, or the necessity of accurate control of the amplitude or level of the gating signal for controlling the switching element.

SUMMARY OF THE INVENTION

It is an object of this invention to provide a signal gating circuit that employs semiconductor switching elements and is free from the above-mentioned disadvantages experienced in the prior art switching circuits.

Another object of this invention is to provide a signal gating circuit in which signal gating is performed by switching off and on a signal transmission path by the operation of semiconductor switching elements in response to a gating signal, and in which the gated output signal does not contain any gating signal component.

Still another object of this invention is to provide a signal gating circuit in which signal gating is performed by switching off and on a signal transmission path by the operation of semiconductor switching elements in response to a gating signal, and in which the amplitude of the gated output signal is not affected by the amplitude or level of the gating signal.

Other objects, features and advantages of this invention will become apparent from the following description taken in conjunction with the accompanying drawings.

DESCRIPTION OF THE PREFERRED EMBODIMENTS

For a better understanding of this invention, a description will be given first of conventional signal gating circuits with reference to FIGS. 1 and 2.

Figures 1, 2, 3, 5A, 5B:
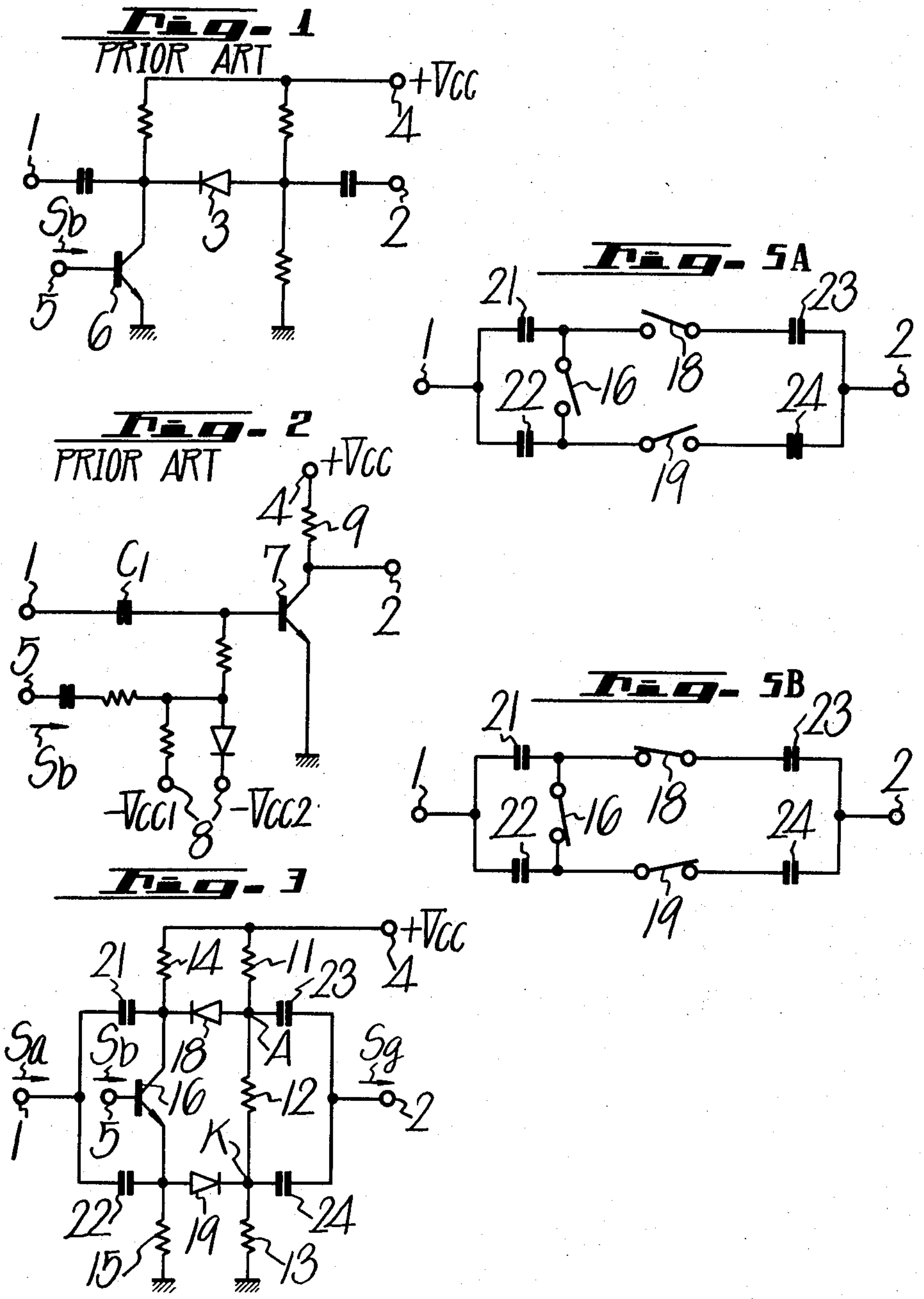
FIGS. 1 and 2 are schematic circuit diagrams showing examples of the conventional signal gating circuit.
FIG. 3 is a schematic circuit diagram showing one example of a signal gating circuit according to this invention.
FIGS. 5A and 5B are equivalent circuits of the circuit exemplified in FIG. 3.

FIG. 1 shows a circuit that has an input terminal 1 connected to an output terminal 2 by a series diode 3. The diode is usually biased in a reverse direction by a voltage from a positive power source terminal 4 and is thereby retained in its non-conductive, or off, state to prevent the transmission of an input signal from the terminal 1 to the terminal 2. Upon application of a gating signal $S_b$ to a terminal 5, the working point of a driving transistor 6, which has been held in its off state, is shifted into its active region and a current flows through its collector and emitter to lower its collector potential, so that the cathode potential of the diode 3 is lowered to cause the diode 3 to be biased in the forward direction and turned on. As a result of this, the input signal from the terminal 1 is transmitted through the diode 3 to the terminal 2. However, the gating circuit in FIG. 1 has the disadvantage that a charge in the collector potential of the transistor 6 caused by the gating signal $S_b$ is produced at the terminal 2 through the diode 3. Thus, a component of the gating signal $S_b$ is included in the gated output. Further, when the transistor 6 is completely turned on by the gating signal $S_b$, the input impedance becomes too low and the input signal is by-passed through the conducting transistor 6, so that the amplitude, or level, of the output signal is extremely small or zero. Therefore, in order to retain the input impedance of the transistor 6 at a predetermined value, the level of the gating signal $S_b$ must be held exactly at a predetermined value.

In the gating circuit of FIG. 2, a gating transistor 7 is usually held in its off state by a negative voltage from a power source terminal 8 to prevent the input signal applied to the terminal 1 from being transmitted to the terminal 2. When the gating signal $S_b$ is supplied to the gate input terminal, the base potential of the transistor 7 is raised to shift its working point into the active region and the input signal from the terminal 1 is transmitted through the transistor 7 to the terminal 2. In this gating circuit, however, when the transistor 7 is turned on, the collector current flows through a collector load resistor 9 to change the collector potential and this potential change appears at the terminal 2. Further, two positive and negative voltage sources are required.

This invention provides an improved signal gating circuit which is capable of effecting gating operation with only one voltage source. It does not include the gating signal component in the gated output signal nor does it require a high degree of accuracy in setting the level of the gating signal.

With reference to FIG. 3 a detailed description will hereinafter be given of one example of this invention.

In the present example, a series circuit of first, second and third resistors 11, 12 and 13 and a series circuit of a resistor 14, the collector-emitter circuit of a driving transistor 16, and a resistor 15 are connected from the positive terminal 4 of a power source and ground. A first diode 18 is connected between the collector of the transistor 16 and the connecting point of the resistors 11 and 12 (hereinafter referred to as a connecting point A) in such a polarity that one portion of a current flowing into the collector of the transistor 16 flows in the diode 18. A second diode 19 is connected between the emitter of the transistor 16 and the connecting point of the resistors 12 and 13 (hereinafter referred to as a connecting point K) in such a polarity that one portion of a current from the emitter of the transistor 16 flows through the diode 19. The base of the transistor 16 is connected to an input terminal 5 for a gating signal $S_b$.

In the illustrated example, capacitors 21 and 22 are respectively connected between an input terminal 1 and the collector of the transistor 16 and between the terminal 1 and the emitter of the transistor 1 as a distribution circuit for an input signal. In addition, capacitors 23 and 24 are respectively connected between the connecting point A and an output terminal 2 and between the connecting point K and the terminal 2 to form an adder circuit. The terminal 1 is supplied with an input signal to be gated, such as the signal $S_a$ shown in FIG. 4A.

In some cases, the resistance values of the resistors 11, 12 and 13 are selected substantially equal to one another and those of the resistors 14 and 15 are also selected substantially equal to each other. Further, the resistance values of the resistors 11–15 are selected to be higher than the impedance of the signal transmission path.

Figures 4A, 4B, 4C, 4D, 4E, 4F, 4G:
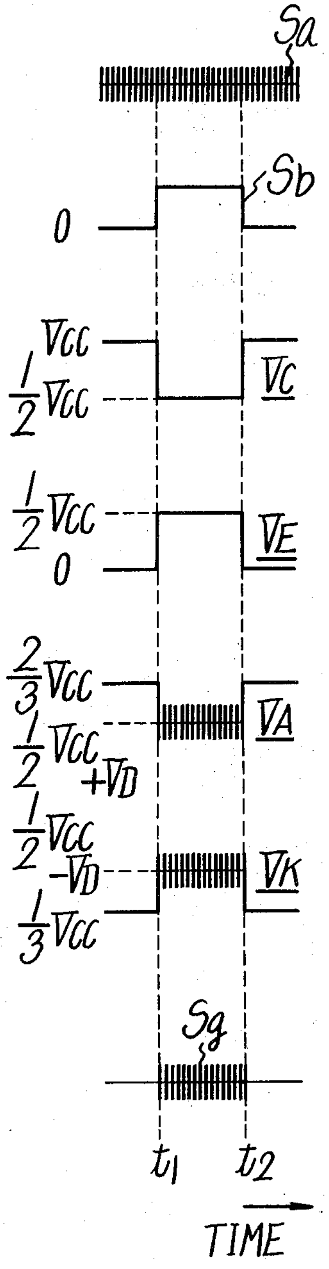
FIGS. 4A–4G are a series of waveform diagrams for explaining the operation of the signal gating circuit of this invention.

With such an arrangement, the gating signal $S_b$ is supplied to the terminal 5 from time $t_1$ to a time $t_2$ as depicted in FIG. 4B. Prior to the time $t_1$ the transistor 16 is in the off state so that its collector potential $V_C$ is at the level of the supply voltage $+V_{cc}$ at the terminal 4. This is shown in FIG. 4C. When the transistor 16 is non-conductive, the emitter potential $V_E$ is at ground potential, as depicted in FIG. 4D, and the potentials $V_A$ and $V_K$ at the connecting points A and K are respectively $\frac{2}{3}V_{cc}$ and $\frac{1}{3}V_{cc}$ determined by the resistors 11–13 as shown in FIGS. 4E and 4F, so that the diodes 18 and 19 are reversely biased to be in their off state. FIG. 5A shows a circuit equivalent to the the gating circuit in this condition. Accordingly, while the gating signal $S_b$ is not supplied as shown in FIG. 4G, the signal transmission path is cut off by the diodes 18 and 19, and no output signal is derived at the terminal 2 prior to the time $t_1$ and after the time $t_2$.

During the interval from time $t_1$ to time $t_2$ that the gating signal $S_b$, as depicted in FIG. 4B, is supplied to the terminal 5 to turn on the transistor 16, its collector and emitter potentials $V_C$ and $V_E$ become $\frac{1}{2}V_{cc}$ respectively (voltage drops in the transistor 16 are neglected). Accordingly, the diodes 18 and 19 are turned on and the potentials $V_A$ and $V_K$ at the connecting points A and K become $\frac{1}{2}V_{cc} + V_D$ and $\frac{1}{2}V_{cc} - V_D$ respectively ($V_D$ being a voltage drop across the diodes 18 and 19). The equivalent of the gating circuit in this condition is shown in FIG. 5B. Therefore, the signal $S_a$ is derived at the points A and K through the diodes 18 and 19 held in the on state. The signals $S_a$ at the points A and K are in phase with each other, and hence are transmitted through the capacitors 23 and 24 to the terminal 2 as an output signal $S_g$.

In this case, the potentials $V_A$ and $V_K$ at the points A and K are changed by the gating signal $S_b$ at the times $t_1$ and $t_2$ but in opposite directions and equal in absolute value to each other, so that these potential changes cancel each other and are not present at the terminal 2. Therefore, the potential changes due to the gating signal $S_b$ do not appear overlapping in the gated output signal $S_g$ shown in FIG. 4G. That is, no component of the gating signal $S_b$ is included in the gated output signal $S_g$.

Even when the transistor 16 is not completely turned on by the gating signal $S_b$ and its working point is shifted to the active region, conduction of the diodes 18 and 19 provides the output signal $S_g$. Further, the potential changes at the points A and K cancel each other for the same reasons as mentioned above and no component of the gating signal $S_b$ is produced at the terminal 2, so that accuracy is not required in selecting the level of the gating signal $S_b$.

As will be apparent from the foregoing, this invention provides a signal gating circuit which requires only one voltage source ($+V_{cc}$) for voltage supply to the terminal 4. It does not produce any gating signal component, nor does it require accuracy in the level of the gating signal.

Figure 6:
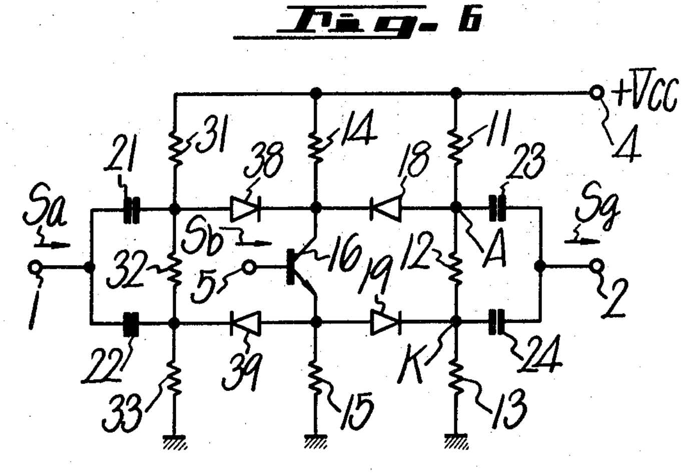
FIGS. 6 and 7 are schematic circuit diagrams showing modified embodiments of this invention.

FIG. 6 shows another example of this invention which is especially adapted for high-speed switching or gating. Most of the components in FIG. 6 are the same as in FIG. 3 and have the same reference characters. In addition, there is a second series circuit of resistors 31, 32 and 33 connected between the terminal 4 and ground. The capacitor 21 is connected between the terminal 1 and the connecting point of the resistors 31 and 32 and the capacitor 22 is connected between the terminal 1 and the connecting point of the resistors 32 and 33. A diode 38 is connected between the connecting point of the resistors 31 and 32 and the collector of the transistor 16 in such a direction that part of the collector current of the transistor 16 flows through the diode 38. A diode 39 is connected between the connecting point of the resistors 32 and 33 and the emitter of the transistor 16 in such a direction that part of the emitter current of the transistor 16 flows through the diode 39.

With such an arrangement, the diodes 18, 19, 38 and 39 are turned on and off by the conduction and non-conduction of the transistor 16, which is caused by the gating signal $S_b$ as in the example of FIG. 3. As was true of the circuit in FIG. 3, the gated output signal of the circuit in FIG. 6 has no gating signal component at the terminal 2. In this case, when the transistor 19 is turned off, the capacitors 21 and 22 are rapidly charged through the resistors 31, 32 and 33, so that high speed switching or gating can be achieved. Further, since two stages of the gating diodes are inserted in series between the input and output terminals 1 and 2, the leakage output signal during non-conduction of the diodes is less than in the circuit in FIG. 3.

Figure 7:
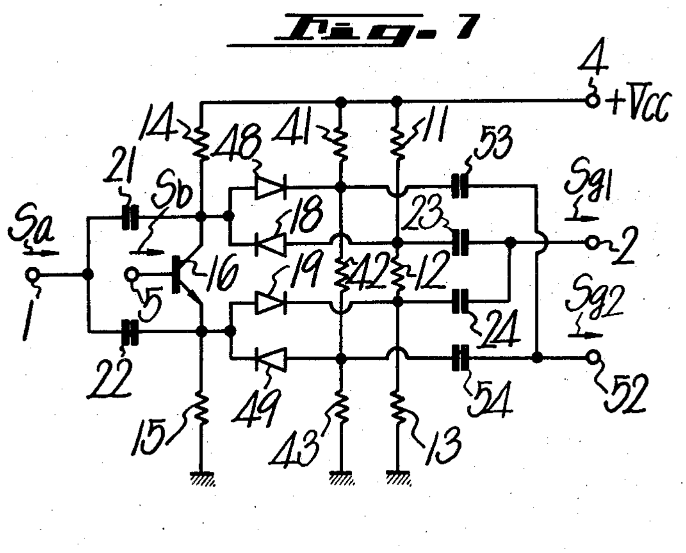

FIG. 7 shows another modified form of this invention, in which a series circuit consisting of resistors 41, 42 and 43 of the same resistance value is connected in parallel with the series circuit of the resistors 11–13 depicted in FIG. 3. A diode 48 is connected between the collector of the transistor 16 and the connecting point of the resistors 41 and 42 in a direction reverse to the diode 18, and a diode 49 is connected between the emitter of the transistor 16 and the connecting point of the resistors 42 and 43 in a direction reverse to the diode 19. A common output terminal 52 is connected by means of the capacitors 53 and 54 to the connecting points of the resistors 41 and 42 and the resistors 42 and 43.

With such an arrangement, when the gating signal $S_b$ is not supplied to the terminal 5, that is, when the transistor 16 is in the off state, the collector and emitter potentials $V_C$ and $V_E$ of the transistor 16 are at $+V_{cc}$ and ground potential, respectively. At the same time, the potentials at the connecting points of the resistors 11 and 12 and the resistors 41 and 42 are $⅔V_{cc}$ respectively, and the potentials at the connecting points of the resistors 12 and 13 and the resistors 42 and 43 are $⅓V_{cc}$ respectively. Therefore, the diodes 18 and 19 are turned off to provide no output from the terminal 2 but the diodes 48 and 49 are turned on to derive an output signal $S_{g2}$ from the terminal 52.

On the other hand, when the gating signal $S_b$ is supplied to the terminal 5, the collector and emitter potentials $V_C$ and $V_E$ of the transistor 16 are $½V_{cc}$ respectively, so that the diodes 18 and 19 are turned on to derive an output signal $S_{g1}$ from the terminal 2 as above described with FIG. 3 but the diodes 48 and 49 are turned off and no output signal is obtained from the terminal 52. Thus, the gated output signals $S_{g1}$ and $S_{g2}$ are alternately obtained from two terminals 2 and 52 in accordance with the gating signal $S_b$.

In this example, too, the potential changes due to the gating signal $S_b$ cancel each other and such changes do not appear in either of the output signals $S_{g1}$ or $S_{g2}$.

It will be apparent that many modifications and variations may be effected without departing from the scope of the novel concepts of this invention.

What is claimed is:

1. A signal gating circuit comprising a bias source having at least two terminals, a first series circuit connected between the bias source terminals, the first series circuit including a first resistor, a second resistor and switching means having first and second terminals connected in series between the first and the second resistors, a second series circuit connected in parallel with the first series circuit, the second series circuit including third, fourth and fifth resistors connected in series, a first diode connected between the connecting point of the switching means and the first resistor and the connecting point of the third and the fourth resistors, a second diode connected between the connecting point of the switching means and the second resistors and the connecting point between the fourth and the fifth resistors, means, including an input terminal, for supplying an input signal simultaneously to both the first and the second diodes, means for supplying a gating signal to the switching means to selectively make it substantially conductive and substantially non-conductive such that the bias potential supplied through the switching means and the first, second, third, fourth, and fifth resistors to the first and the second diodes causes them both to simultaneously become substantially conductive and substantially non-conductive, respectively, an output terminal, and means connected to the connecting point of the third and the fourth resistors and the connecting point of the fourth and the fifth resistors for combining the signals passed by the diodes while in their conductive states to produce an output signal at the output terminal representative of the gated input signal.

2. A signal gating circuit according to claim 1, in which said switching means comprises a transistor having its emitter and collector electrodes connected in series between said first and second resistors.

3. A signal gating circuit according to claim 2, in which the collector and emitter of said transistor are connected to said first and second diodes, respectively, and the base of said transistor is supplied with said gating signal.

4. A signal gating circuit according to claim 1, in which said first and second resistors have substantially the same resistance value and said third, fourth and fifth resistors have substantially the same resistance value.

5. A signal gating circuit according to claim 1 comprising, in addition, means connected to said diodes to bias both of said diodes to be non-conductive except when said gating signal is supplied to said switching means.

6. A signal gating circuit according to claim 5, in which said first diode is connected to the collector of said transistor to supply part of the current thereto when said transistor is conductive and said second diode is connected to the emitter of said transistor to conduct part of the emitter current of said transistor when said transistor is conductive.

7. A signal gating circuit according to claim 5, in which the resistance values of all said resistors is substantially greater than the emitter-collector impedance of said transistor when said transistor is conductive in response to said gating signal.

8. A signal gating circuit according to claim 1, in which said means for supplying an input signal to said first diode comprises a first capacitor connected in series between said input terminal and said first diode, said means for supplying an input signal to said second diode comprises a second capacitor connected in series between said input terminal and said second diode, said means for deriving said output signal from said first diode comprises a third capacitor connected between the common connection point between said third and fourth resistors and said output terminal, and said means for deriving said output signal from said second diode comprises a fourth capacitor connected in series between the common connection between said fourth and fifth resistors and said output terminal.

9. A signal gating circuit according to claim 8 comprising, in addition:

A. A third circuit connected in parallel with said first and second circuits and comprising sixth, seventh, and eighth resistors connected in series;

B. A third diode connected between the common connection point of said sixth and seventh resistors and the common connection point between said first resistor and said first diode;

C. A fourth diode connected in series between the common connection point of said seventh and eight resistors and the common connection point between said second resistor and said second diode, said first capacitor being connected in series between said input terminal and said common connection point between said sixth and seventh resistors and said second capacitor being connected in series between said input terminal and said common connection point between said seventh and eighth resistors, whereby said first capacitor is connected through said third diode to said first diode and said second capacitor is connected through said fourth diode to said second diode.

10. A signal gating circuit according to claim 9, in which said third and fourth diodes are polarized to turn on when said first and second diodes become conductive.

11. A signal gating circuit according to claim 1 comprising, in addition:

A. A second output terminal:

B. Third circuit means connected in parallel with said first and second circuit means and comprising sixth, seventh, and eighth resistors;

C. A third diode connected in series between said first terminal of said switching means and the connecting point of said sixth and seventh resistors and polarized oppositely with respect to said first diode;

D. A fourth diode connected in series between said second terminal of said switching means and the connecting point of said seventh and eighth resistors and polarized oppositely with respect to said second diode;

E. A third capacitor connecting said connecting point between said sixth and seventh resistors to said second output terminal; and F. A fourth capacitor connecting said connecting point between said seventh and eighth resistors to said second output terminal, whereby said first-named output terminal receives the signal applied to said input terminal only for the duration of said gating signal and said signal applied to said input terminal is withheld from said second output terminal only for the duration of said gating signal.

12. A signal gating circuit comprising a bias source having at least two terminals, a first series circuit connected between the bias source terminals, the first series circuit including a first resistance, a second resistance and switching means connected between the first and the second resistances, a second series circuit connected in parallel with the first series circuit, the second series circuit including a third, a fourth and a fifth resistance connected in series, a first diode connected between the connecting point of the switching means and the first resistance and the connecting point of the third and the fourth resistances, a second diode connected between the connecting point of the switching means and the second resistance and the connecting point between the fourth and the fifth resistances, means for supplying an input signal simultaneously to both the first and the second diodes, means for selectively operating the switching means to become substantially conductive and substantially non-conductive such that the bias potential supplied through the switching means and the first, second, third, fourth, and fifth resistances to the first and the second diodes causes them both to simultaneously become substantially conductive and substantially non-conductive, respectively, and means connected to the connecting point of the third and the fourth resistances and the connecting point of the fourth and the fifth resistances for combining the signals passed by the diodes while in their conductive states to produce an output signal representative of the gated input signal.

* * * * *